May 14, 1940. T. C. WELTMER 2,200,867

CAKE PACKAGE OR THE LIKE

Original Filed Jan. 10, 1935

INVENTOR.
Tracy C. Weltmer
BY A. Trevor Jones
ATTORNEY.

Patented May 14, 1940

2,200,867

UNITED STATES PATENT OFFICE 2,200,867

CAKE PACKAGE OR THE LIKE

Tracy C. Weltmer, Kansas City, Mo., assignor, by mesne assignments, to Interstate Bakeries Corporation, Kansas City, Mo., a corporation of Delaware Original application January 10, 1935, Serial No. 25,779. Divided and this application March 23, 1939, Serial No. 263,607

1 Claim. (Cl. 206—44)

This invention relates to cake package or the like, more particularly for displaying articles of food such as cakes, pastries or other bakery products.

An important object of the invention is to provide a display container of the class described which can be produced at a minimum cost and which will be sufficiently sturdy to withstand the usual handling to which such goods are subjected, while at the same time protecting the contents both against mutilation and exposure, and affording a maximum of visibility.

The invention will be understood by reference to the accompanying drawing, in which—

Figure 1:
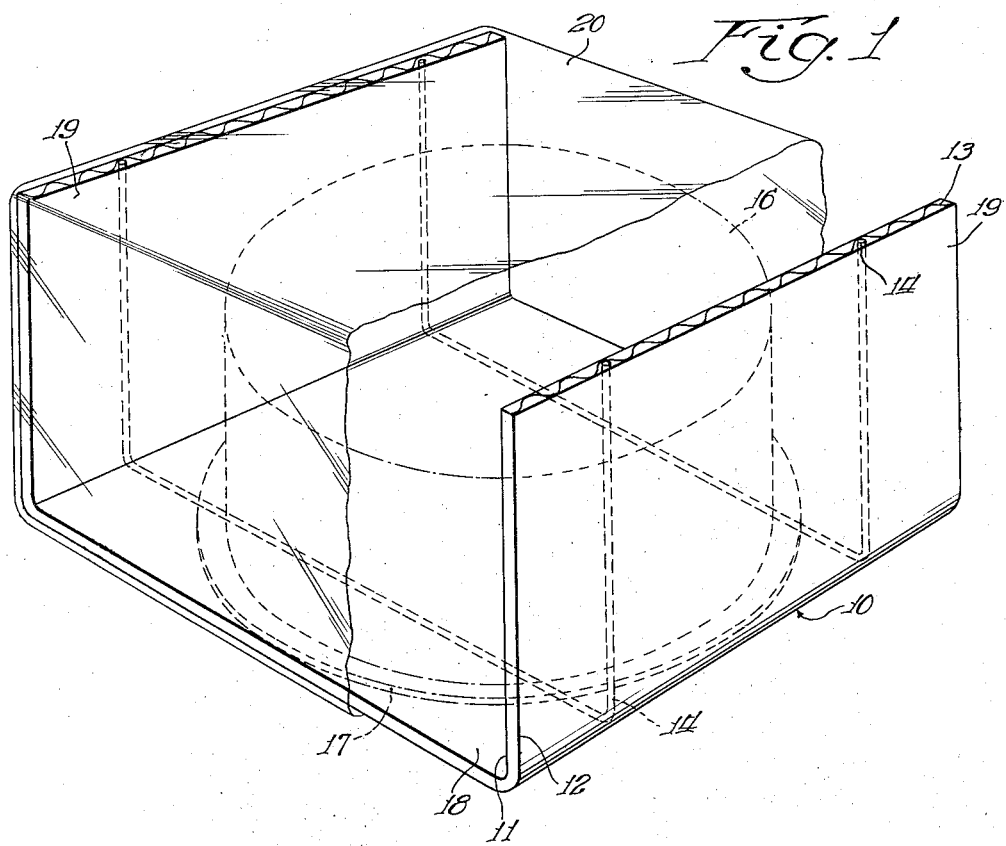
Figure 1 is a perspective view of the improved package.
Figure 2:
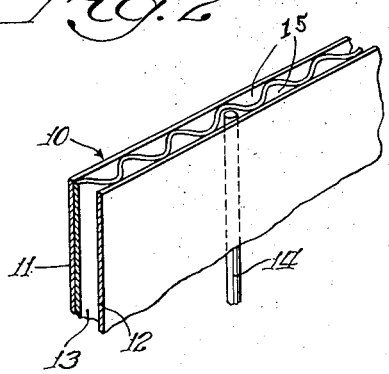
Figure 2 is a fragmentary view showing details of construction.

Referring to the drawing, the body 10 of the container is desirably formed of inexpensive so-called corrugated card-board formed as here shown, of outer layers 11 and 12 and an inner corrugated layer per se 13.

The body 10 advantageously is initially formed in the flat and in such initial stage has passed through it one or more, in this instance, two, reinforcing wires 14 co-terminous with the body. By the cellular construction shown, there is provided the longitudinally running interstices 15 formed by the corrugations of the inner member 13 of the body forming passageways snugly receiving the wires 14.

Thereafter the body, with its reinforcing wires 14, is bent to container shape shown in Fig. 1 and providing three sides of the container but defining a cubical in which may be received the cake or other pastry product 16. The cake 16 is desirably adhered as by frosting or the like on the cake, before the frosting has congealed, to a card-board pad 17 disposed on the bottom 18 of the container formed by the intermediate section thereof. Frictional engagement of the pad 17 with the sides 19 of the container hold the pad and cake in position thereon, it being understood that the sides 19 may be a distance apart a trifle less than the diameter of the pad 17 and that the width of the container transversely of the wires 14 is also approximately equal to the diameter of the pad 17. The cake 16 being somewhat smaller in diameter than the pad 17 is thus held out of contact with the sides 19 and these sides are also of sufficient height to extend above the top of the cake.

Thereafter a Cellophane cover or closure 20 is desirably placed around the entire package including the body 10 with its reinforcing wires 14, and pad 17 and cake 16, this closure being sealed in the usual manner well known to the art and not necessary to be here described.

Thus the cake or the like may be wrapped if desired by machinery in a continuous process as the cakes are produced and without waiting for the frosting to congeal, since the frosting is at all times maintained out of contact with the container, being spaced from the sides and top thereof, to prevent staining the container or disturbing the frosting, while at the same time the cake is visible through the transparent Cellophane closure so as to be attractively visible to the prospective purchaser.

This visibility is enhanced by the fact that the opaque inexpensive body 10 only forms three sides of the container leaving not only the top but two other sides thereof unobstructed for visibility and appearance.

This application is a division of my co-pending application Serial No. 25,779 filed January 10, 1935 entitled "Art of packaging", now matured into Patent No. 2,160,183.

Having described my invention, I claim—

A cake package or the like comprising an inexpensive card-board body of cellular construction having longitudinally extending passageways therein, a reinforcing wire disposed in at least one of said longitudinally extending passageways, the body being thereafter bent to form a bottom and two sides of a relatively deep cubically defined container with the wire likewise bent, said wire terminating substantially flush with the upper ends of the sides, a cake or the like disposed on the bottom member of the body and spaced from the sides thereof, said cake also terminating short of the upper ends of said sides, and a transparent closure thereafter arranged about said container and cake snugly contacting said container but supported by said sides spaced from said cake.

TRACY C. WELTMER.